Sept. 20, 1955     C. E. HENKE     2,718,016
DAN BUOY
Filed Sept. 29, 1952

INVENTOR.
CARL E. HENKE

BY Ely, Frye & Hamilton
ATTORNEYS

United States Patent Office 2,718,016
Patented Sept. 20, 1955

2,718,016
DAN BUOY

Carl E. Henke, Cleveland, Ohio, assignor to Robert C. Switzer, Shaker Heights, and Joseph L. Switzer, Gates Mills, Ohio Application September 29, 1952, Serial No. 312,005

6 Claims. (Cl. 9—8)

The present invention relates to a marking buoy and more specifically to an expendable Dan buoy highly suited for tactical use by naval and amphibious forces.

In certain mine laying operations and in amphibious attacks and raids it is essential that unmined or cleared sea channels be immediately and positively marked for ready identification by succeeding friendly forces or to permit quick withdrawal from beachheads or mined areas without unnecessary losses. Dan buoys used for this purpose may be dropped from either surface craft or aircraft.

Dan buoys must be readily disposable and sinkable so that in order to preclude enemy orientation, they may be immediately and summarily destroyed without trace by gunfire or other means after they have served their purpose. Because they are frequently delivered by helicopter or other light aircraft and for other obvious logistical reasons, they must be light in weight and compact in storage, but their expansion into operative shape must be unfailing because, if a faulty marker is laid, the loss of time in returning to replace it may be fatal to the success of the operation. They must remain highly visible and positively located during use.

The balloons and floats presently employed as Dan buoys have several serious disadvantages. Their generally bulky shape causes such buoys to develop enormous anchor drags under the action of wind, waves, tides and currents. Anchors large enough to resist such drags are prohibitively heavy, so that false marking remains a dreadful possibility. Automatic balloon inflating devices are not unfailing in operation and accordingly, it has been necessary to start balloon inflation before dropping to be certain that the balloon will open. This operation is particularly cumbersome when the drop is from aircraft. Even when inflation is once begun, impact of the balloon and its inflating mechanism with the water frequently causes failure or rupture. Balloon envelopes tend to float after being destroyed by gunfire, making immediate positive disposition impossible.

I have invented a Dan buoy which overcomes the above disadvantages. My Dan buoy may be manufactured for less than half the cost of conventional balloon buoys and is compact in storage, foolproof in use and adapted to be quickly and tracelessly destroyed. My buoy presents the aspect of an erect pole which maintains vertical erection even under the action of heavy seas and tides, thus assuring maximum visibility at all times and reducing anchor drag. Anchor drag is further reduced through the employment of a sleeve skirt which acts as a sea anchor and which also functions as a shock absorber to eliminate damage upon impact. My buoy opens positively and instantaneously upon release and sinks positively and instantaneously upon puncture. It may be easily picked up and readily collapsed, so that if an area is secured, recovery rather than destruction of channel markers may be feasible. In short, my buoy is superior to previous buoys with regard to ease and certainty of laying, lack of dirt, visibility, disposability and economy.

Other objects and advantages of my invention will appear in the following specific description and in the accompanying drawings in which.

Figure 1:
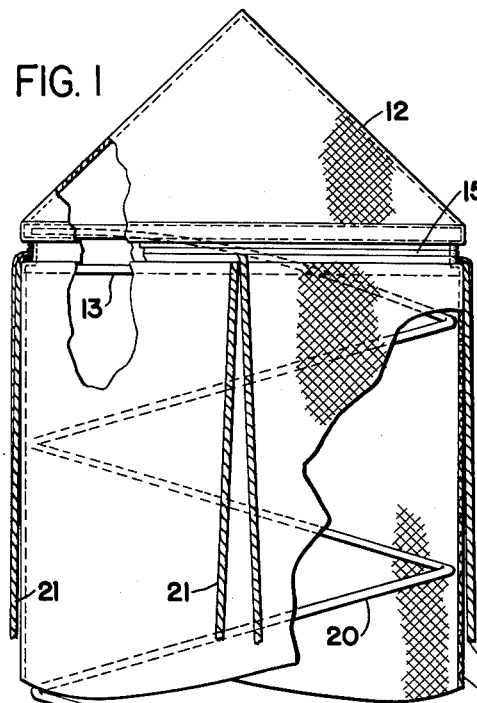
Figure 1 is an elevation, partly broken away, of my Dan buoy in expanded operative position.

My buoy comprises an upper airtight cylindrical envelope 10 and a lower porous skirt 11 of canvas or similar material. The envelope 10 terminates in a preferably conical peak 12 and is fabricated from any suitable brightly colored flexible airtight material. Materials coated with daylight fluorescent pigment coatings capable of perception far beyond the range of normal subtractive color perceptibility are ideal for this purpose because of their vastly superior visibility. The length of the skirt 11 may be roughly half the length of the envelope 10.

The envelope 10 is joined at its lower end to the skirt 11 by an overlapping stitched seam. A channel ring 13 supports the upper end of the envelope 10 and an identical ring 14 underlies the overlapping seam between the envelope 10 and the skirt 11. The rings 13 and 14 are bound to the supported materials by wire 15 which is wound tightly around the supported materials so as to hold them firmly within the channels of the rings 13 and 14. Within the foot of the skirt 11 is a support and weight member which may have a ring shaped perimeter 16 and central crossbars 17 conveniently usable as tie-on members. The lower end of the skirt 11 may be turned under around the ring 16 and stitched, being cut and fitted to the ends of the crossbars 17.

Fastened to the inside of the rings 13 and 14 and extending between them is a light coil spring 20 which need be only strong enough to move the rings 13 and 14 rapidly apart from collapsed position.

Figure 3:
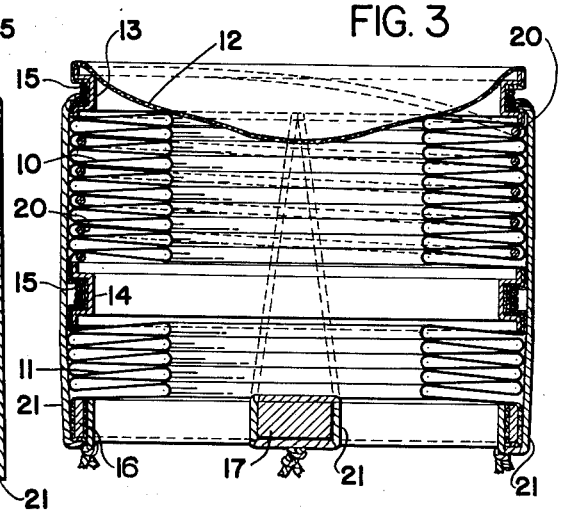
Figure 3 is a view of the buoy in its collapsed position.
Figure 2:
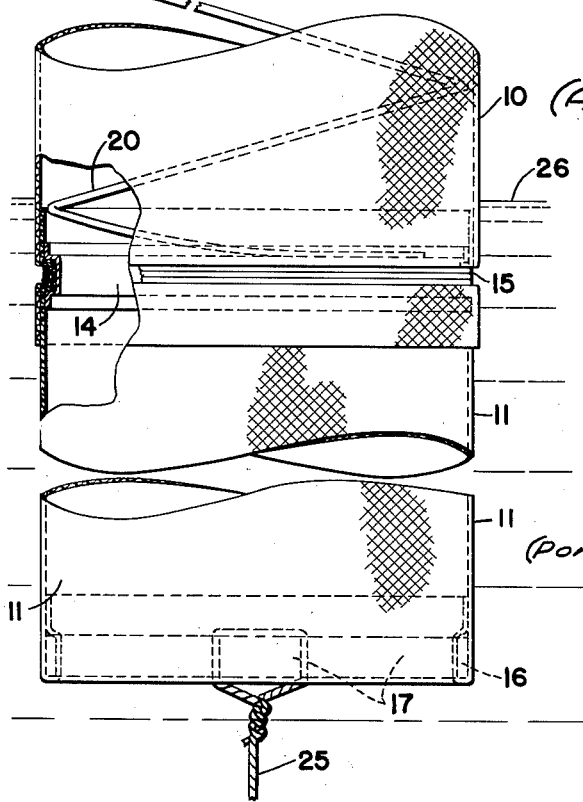
Figure 2 is a bottom view of the buoy illustrated in Figure 1.

The buoy in its collapsed position is illustrated in Figure 3. Tie lines 21 loop under the retaining wire 15 which is wound around the upper ring 13 and are tied to the cross bars 17. The conical peak 12 nests loosely within the collapsed assembly. The envelope 10 and skirt 11 are folded in pleats between the turns of the compressed spring 20. The coil diameter of the spring is preferably chosen so that in expanded position the spring will just underlie the surface of the envelope 10.

The anchor line 25 for the buoy may conveniently be secured around the crossbars 17 as illustrated in Figure 1. The anchor used with my buoy is of any conventional type. Usually the method of buoy distribution determines the type of anchor to be used. If distribution is to be by surface craft, it may be most feasible to use relatively heavy concrete blocks which need not be inventoried but may be made in the field shortly before the marking operation. On the other hand, for a drop from light aircraft, it may be desirable to use stocked but expendable relatively light claw anchors. In either event, my Dan buoy will not drag anchor even when lighter anchors are employed than those used with conventional buoys.

When my buoy is to be placed, the lines 21 are severed and the buoy is dropped overboard. The spring 20 quickly opens the envelope 10 and the weight member comprising the ring 16 and the crossbars 17 lowers the skirt 11 and causes the entire assembly to parachute to the water. The air pressure built up within the envelope 10 forces the conical peak 12 into extended shape. As the buoy strikes the water, the pressure of air trapped within the skirt 11 momentarily builds up and is thereupon relieved through the porous skirt wall to give a cushioning or shock-absorbing action. The buoy comes to rest in the water with the water line slightly above the bottom of the envelope 10, as at 26.

The provision of an envelope 10 without a porous skirt 11 might appear to be expedient, but such an arrangement will float high in an unstable position until the buoy stabilizes itself by tilting to partially collapse its walls and relieve some air. As the buoy tends to return to the vertical, the pressure of contained air drops further so that the buoy envelope remains in a partially collapsed position manifestly unsuitable for its purpose. It will be noted that the porous skirt 11 of my buoy precludes final entrapment of such a high column of air and the buoy therefore does not come to rest in the initially high unstable position described above but rather floats on the water in a stable manner in fully expanded erect position with its center of gravity well below its center of buoyancy.

The buoy continues to float in erect position even in high seas and currents. Tension of the anchor line is accommodated by the flexible skirt 11 which folds under the water line in the direction from which the anchor line extends, so that the buoy is not tilted to any significant degree by anchor line tension. The incidence of tension on the anchor line is minimized by the action of the skirt 11 as a sea anchor which has great resistance to displacement when the anchor line is slack (and the skirt hangs down in a fully open attitude) but which has minimal drag when the anchor line is taut and the skirt is partially closed or folded.

In extremely high seas, any buoy approaches a weightless condition as it drops after the passage of abrupt wave crests. When this occurs, my buoy may momentarily start to tilt or collapse because the weight 16, 17 no longer has any stabilizing effect and the receding water line tends to lower the air pressure within the envelope. This momentary tendency to collapse or tilt will not, however, cause any loss of air because the skirt 11 will pinch closed to act as an air retaining valve. Within a fraction of a second after the crest has passed, the buoy will be in fully erect postion without any air loss or any degree of permanent collapse.

The spring 20, besides assuring quick opening of the buoy, acts as a brace or form to prevent distortion of the buoy in high winds and to further insure against collapse of the buoy in high seas.

Puncture of the envelope 10 at its upper end causes the buoy to sink positively and rapidly. The long thin envelope has no tendency to float or linger on the surface of the water, the weight 16, 17 drawing the envelope completely under water in a matter of seconds.

A number of modifications in the Dan buoy I have disclosed will suggest themselves. For example, the shape of my buoy may be polygonal rather than be cylindrical, its weighting arrangement may be varied and it may be fabricated in a number of ways other than those disclosed. Accordingly, my invention is not to be limited in scope to the specific embodiment illustrated but is to be defined solely by the following claims.

What is claimed is:

1. In a marker buoy, a flexible sleeve having an upper closed end and a lower open end, first former means on said sleeeve at said upper closed end, weighting means at said lower end, second former means on said sleeve intermediate said upper and lower ends, the upper portion of said sleeve terminating in said upper closed end comprising an airtight envelope, a coil spring underlying said envelope and extending between said first and second former means, releasable fastening means to hold said first and second former means adjacent each other with said coil spring compressed therebetween and a porous zone on said sleeve between said airtight envelope and said lower open end.

2. In a marker buoy, a flexible sleeve having an upper closed end and a lower open end, first former means on said sleeve at said upper closed end, weighting means at said lower end, second former means on said sleeve intermediate said upper and lower ends, the upper portion of said sleeve terminating in said upper closed end comprising an airtight envelope, a coil spring underlying said envelope and extending between said first and second former means, and a porous zone on said sleeve between said airtight envelope and said lower open end.

3. A Dan buoy comprising a flexible sleeve having a closed end and an open end, the portion of said sleeve adjacent said closed end forming an airtight envelope, the portion of said sleeve adjacent said open end comprising a skirt of porous fabric extending from said airtight envelope, said sleeve having weighting means at its open end, the length and integrated cross-sectional areas of said airtight envelope and the weight of said buoy including said weighting means being so interrelated that the waterline of said buoy in floating position is remote from said closed end of said buoy and is near the juncture of said airtight envelope and said porous skirt.

4. A marker buoy comprising a flexible sleeve having an upper closed end and a lower open end, first rigid former means on said sleeve at said upper closed end, weighting means at said lower end, second rigid former means on said sleeve intermediate said upper and lower ends, a coil spring extending between said first and second rigid former means, the upper portion of said sleeve terminating in said upper closed end comprising an airtight envelope, and a porous zone on said sleeve between said airtight envelope and said lower open end.

5. A buoy comprising a flexible sleeve having an upper closed end and a lower open end, the upper portion of said sleeve terminating in said upper closed end comprising an airtight envelope, a porous zone comprising a circumferential belt of porous fabric on said sleeve between said airtight envelope and said lower open end, and weighting means below said porous zone, the length and integrated cross-sectional areas of said airtight envelope and the weight of said buoy including said weighting means being so interrelated that the waterline of said buoy in floating position is remote from said closed end of said buoy and is near the juncture of said airtight envelope and said porous skirt.

6. A marker buoy comprising a flexible sleeve having an upper closed end and a lower open end, first rigid former means on said sleeve at said upper closed end, weighting means at said lower end, second rigid former means on said sleeve intermediate said upper and lower ends, the upper portion of said sleeve terminating in said upper closed end comprising an airtight envelope, a coil spring extending between said first and second rigid former means, releasable fastening means to hold said first and second rigid former means adjacent each other with said coil spring compressed therebetween, and a porous zone on said sleeve between said airtight envelope and said lower open end.

References Cited in the file of this patent

UNITED STATES PATENTS

| 1,400,316 | Reno | Dec. 13, 1921 |
| 2,451,002 | Sturtevant | Oct. 12, 1948 |

FOREIGN PATENTS

| 471,166 | France | Oct. 17, 1914 |
| 681,844 | Germany | Oct. 3, 1939 |